United States Patent
Zhou et al.

(10) Patent No.: US 9,082,231 B2
(45) Date of Patent: Jul. 14, 2015

(54) SYMMETRY-BASED VISUALIZATION FOR ENHANCING ANOMALY DETECTION

(71) Applicants: Xiang Sean Zhou, Exton, PA (US); Gerardo Hermosillo Valadez, West Chester, PA (US)

(72) Inventors: Xiang Sean Zhou, Exton, PA (US); Gerardo Hermosillo Valadez, West Chester, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 253 days.

(21) Appl. No.: 13/737,987

(22) Filed: Jan. 10, 2013

(65) Prior Publication Data

US 2013/0182008 A1    Jul. 18, 2013

Related U.S. Application Data (60) Provisional application No. 61/585,797, filed on Jan. 12, 2012.

(51) Int. Cl.

| | |
|---|---|
| *G06K 9/32* | (2006.01) |
| *G06K 9/00* | (2006.01) |
| *G06T 11/60* | (2006.01) |
| *G06T 11/00* | (2006.01) |
| *G06T 7/00* | (2006.01) |
| *G06T 3/00* | (2006.01) |

(52) U.S. Cl.
CPC ............... *G06T 11/60* (2013.01); *G06T 3/0068* (2013.01); *G06T 7/0014* (2013.01); *G06T 11/00* (2013.01); *G06T 2200/24* (2013.01); *G06T 2207/10072* (2013.01); *G06T 2207/10116* (2013.01); *G06T 2207/10136* (2013.01); *G06T 2207/30004* (2013.01)

(58) Field of Classification Search
None
See application file for complete search history.

(56) References Cited

U.S. PATENT DOCUMENTS

| | | | | |
|---|---|---|---|---|
| 6,868,176 | B2 * | 3/2005 | Sugawara | 382/151 |
| 6,919,892 | B1 * | 7/2005 | Cheiky et al. | 345/473 |
| 7,212,673 | B2 * | 5/2007 | Wenzel | 382/203 |
| 7,646,899 | B2 * | 1/2010 | Fitzpatrick | 382/128 |
| 7,653,263 | B2 * | 1/2010 | Wheeler et al. | 382/294 |
| 7,724,931 | B2 * | 5/2010 | Kuth et al. | 382/128 |
| 8,270,697 | B2 * | 9/2012 | Kim | 382/131 |
| 8,731,255 | B2 * | 5/2014 | El-Baz | 382/128 |
| 8,768,036 | B2 * | 7/2014 | Caligor et al. | 382/132 |

* cited by examiner

*Primary Examiner* — Daniel Mariam
(74) *Attorney, Agent, or Firm* — Peter R. Withstandley (57) ABSTRACT

Disclosed herein is a framework for facilitating symmetry-based visualization. In accordance with one aspect of the framework, one or more medical images are received. The medical images include first and second regions, wherein the first region is substantially symmetric to the second region. A transformation is performed on at least the second region to generate a transformed second region. The transformed second region is registered with the first region to generate an aligned second region. The aligned second region and the first region are then alternately displayed to assist anomaly detection.

15 Claims, 9 Drawing Sheets

SYMMETRY-BASED VISUALIZATION FOR ENHANCING ANOMALY DETECTION

CROSS-REFERENCE TO RELATED APPLICATION

This application claims the benefit of U.S. provisional application No. 61/585,797, filed Jan. 12, 2012, the entire contents of which are incorporated herein by reference.

TECHNICAL FIELD

The present disclosure relates to diagnostic imaging and, more specifically, to automated or semi-automated systems and methods for enhancing detection of anomalies in digital or digitized medical images using symmetry-based visualization.

BACKGROUND

The field of medical imaging has seen significant advances since the time X-Rays were first used to determine anatomical abnormalities. Medical imaging hardware has progressed in the form of newer machines such as Medical Resonance Imaging (MRI) scanners, Computed Axial Tomography (CAT) scanners, etc. Because of large amount of image data generated by such modern medical scanners, there has been and remains a need for developing image processing techniques that can automate some or all of the processes to determine the presence of anatomical abnormalities in scanned medical images.

Recognizing anatomical structures within digitized medical images presents multiple challenges. For example, a first concern relates to the accuracy of recognition of anatomical structures within an image. A second area of concern is the speed of recognition. Because medical images are an aid for a doctor to diagnose a disease or condition, the speed with which an image can be processed and structures within that image recognized can be of the utmost importance to the doctor reaching an early diagnosis. Hence, there is a need for improving recognition techniques that provide accurate and fast recognition of anatomical structures and possible abnormalities in medical images.

Digital medical images are constructed using raw image data obtained from a scanner, for example, a CAT scanner, MRI, etc. Digital medical images are typically either a two-dimensional ("2-D") image made of pixel elements or a three-dimensional ("3-D") image made of volume elements ("voxels"). Such 2-D or 3-D images are processed using medical image recognition techniques to determine the presence of anatomical structures such as cysts, tumors, polyps, etc. Given the amount of image data generated by any given image scan, it is preferable that an automatic technique should point out anatomical features in the selected regions of an image to a doctor for further diagnosis of any disease or condition.

Automatic image processing and recognition of structures within a medical image is generally referred to as Computer-Aided Detection (CAD). A CAD system can process medical images and identify anatomical structures including possible anomalies for further review. Such possible anomalies are often called candidates and are considered to be generated by the CAD system based upon the medical images.

CAD systems are often used to aid visual inspection by radiologists to detect anomalies in medical images. Human visual inspection and analysis of images usually takes from minutes to hours to complete. Due to the poor discrimination of anomalous regions in some images, however, many false alarms or missed detections may result. Current technology provides poor visualization support for this time-consuming and error-prone task.

Therefore, there exists a need to improve image visualization to facilitate anomaly detection.

SUMMARY

The present disclosure relates to a framework for facilitating symmetry-based visualization. In accordance with one aspect of the framework, one or more medical images are received. The medical images include first and second regions, wherein the first region is substantially symmetric to the second region. A transformation is performed on at least the second region to generate a transformed second region. The transformed second region is registered with the first region to generate an aligned second region. The aligned second region and the first region are then alternately displayed to assist anomaly detection.

In accordance with another aspect, an input image including first and second substantially symmetric regions is received. An initial reference image is set to the input image. A transformation is performed on the reference image to generate a transformed image. The reference image is then registered with the transformed image to generate a registered image. If an error of the registration is not within a predefined threshold, the next reference image is set to the registered image. The transformation and registration steps are then repeated until the registration error is within the predefined threshold.

This summary is provided to introduce a selection of concepts in a simplified form that are further described below in the following detailed description. It is not intended to identify features or essential features of the claimed subject matter, nor is it intended that it be used to limit the scope of the claimed subject matter. Furthermore, the claimed subject matter is not limited to implementations that solve any or all disadvantages noted in any part of this disclosure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings. Furthermore, it should be noted that the same numbers are used throughout the drawings to reference like elements and features.

DETAILED DESCRIPTION

In the following description, numerous specific details are set forth such as examples of specific components, devices, methods, etc., in order to provide a thorough understanding of embodiments of the present invention. It will be apparent, however, to one skilled in the art that these specific details need not be employed to practice embodiments of the present invention. In other instances, well-known materials or methods have not been described in detail in order to avoid unnecessarily obscuring embodiments of the present invention. While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

The term "x-ray image" as used herein may mean a visible x-ray image (e.g., displayed on a video screen) or a digital representation of an x-ray image (e.g., a file corresponding to the pixel output of an x-ray detector). The term "in-treatment x-ray image" as used herein may refer to images captured at any point in time during a treatment delivery phase of a radiosurgery or radiotherapy procedure, which may include times when the radiation source is either on or off. From time to time, for convenience of description, CT imaging data may be used herein as an exemplary imaging modality. It will be appreciated, however, that data from any type of imaging modality including but not limited to X-Ray radiographs, MRI, CT, PET (positron emission tomography), PET-CT, SPECT, SPECT-CT, MR-PET, 3D ultrasound images or the like may also be used in various embodiments of the invention.

Unless stated otherwise as apparent from the following discussion, it will be appreciated that terms such as "segmenting," "generating," "registering," "determining," "aligning," "positioning," "processing," "computing," "selecting," "estimating," "detecting," "tracking" or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, embodiments of the present invention are not described with reference to any particular programming language. It will be appreciated that a variety of programming languages may be used to implement embodiments of the present invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R or $R^7$, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

A framework for providing visualization to assist anomaly detection in medical images will now be described. The present framework is based on the observation that many parts of the human anatomy exhibit some form of geometric symmetry (or self-similarity). Gross asymmetry is found only in some internal anatomical features, such as the heart, liver, spleen, colon, etc. The human brain, for instance, exhibits bilateral (or reflection) symmetry and can be divided by a mid-sagittal plane into two halves that are mirror images of each other. Other anatomical features, such as the femur head, may exhibit radial (or rotational) symmetry in which components are arranged regularly around a central axis. Other types of symmetry may also be exhibited. In addition, it should be noted that the anatomical feature may exhibit more than one type of symmetry (e.g., both bilateral and rotational symmetry). Such symmetry may be exhibited by the anatomical structure itself or with respect to another anatomical structure. For instance, the pelvis exhibits intrinsic bilateral symmetry, and may be divided into two halves that are mirror images of each other. In addition, or alternatively, some bones or anatomical structures are associated with left and right extremities. The left femur bone, for instance, is symmetric to the right femur bone.

Although some diseases (e.g. osteoporosis) may affect all parts of a symmetric anatomy uniformly, most diseases or anomalies, such as cancers, lesions, trauma, fractures, etc., will affect anatomy and function—thus produce imaging findings—in a random and asymmetric fashion. Therefore, by alternately displaying the first region containing the anomaly with a substantially symmetric second region (typically without the anomaly) that has been aligned with the first region, the anomaly may be "flashed" within the display area and can therefore be easily perceived by the human eye. This advantageously improves the accuracy and confidence in the visual inspection process. These exemplary advantages and features will be described in more detail in the following description.

The present technology may be applied to visualizing many types of anatomical structures that exhibit some form of geometric symmetry, such as repetitive structures (e.g., ribs, vertebra bodies, femur, etc.), elongated structures (e.g., bones, blood vessels, vascular system, airways, etc.), organs (e.g., brain, lungs, etc.) and so forth, as well as anomalies or diseases associated with such anatomical structures. In addition, the present framework can be applied to image data acquired by one or more different imaging modalities, including but not limited to, magnetic resonance (MR) imaging, computed tomography (CT), helical CT, x-ray, positron emission tomography (PET), PET-CT, fluoroscopic, ultrasound, single-photon emission computed tomography (SPECT), SPECT-CT, MR-PET, etc.

Figure 1:
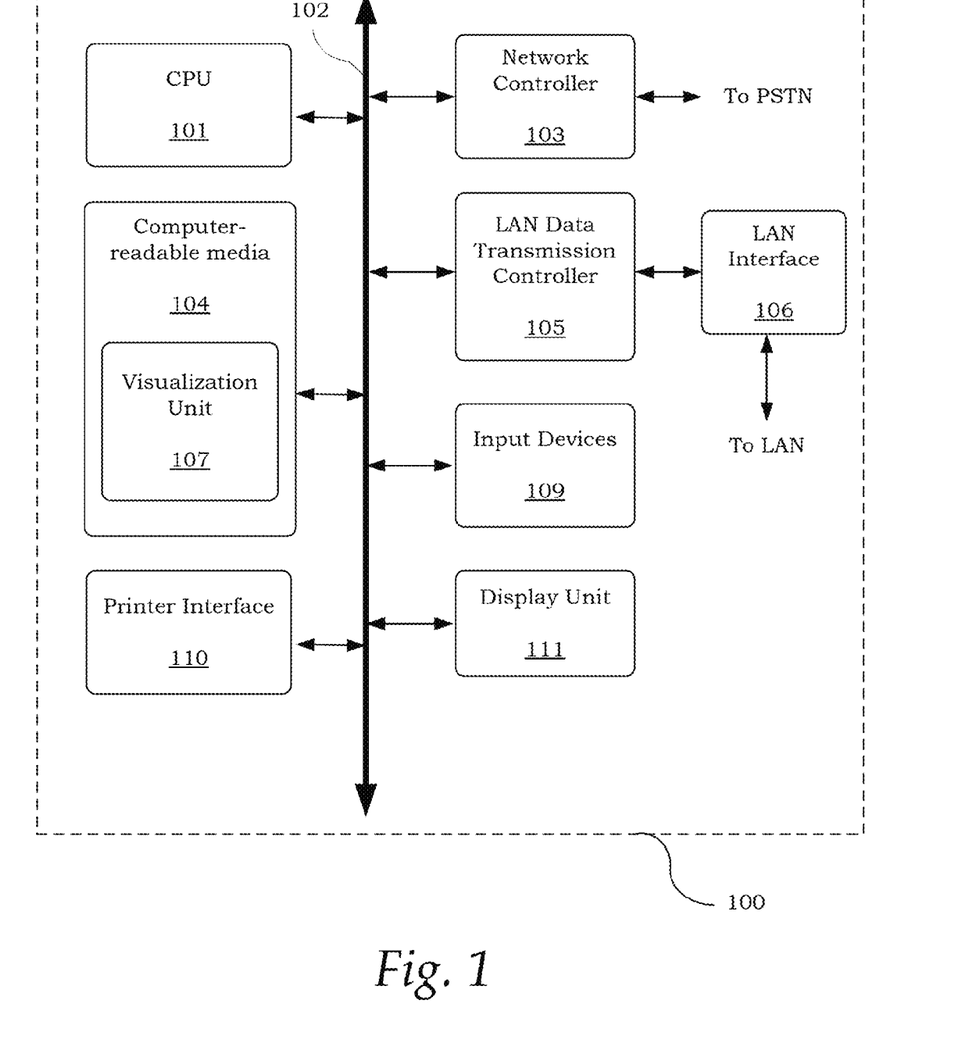
FIG. 1 shows an exemplary computer system.

FIG. 1 shows an exemplary computer system for implementing a method and system of the present disclosure. The computer system referred to generally as system 100 may include, inter alia, a central processing unit (CPU) 101, computer-readable media 104, a printer interface 110, a display unit 111, a local area network (LAN) data transmission controller 105, a LAN interface 106, a network controller 103, an internal bus 102, and one or more input devices 109, for example, a keyboard, mouse, touch screen, etc. Computer system 100 may further include support circuits such as a cache, power supply, clock circuits and a communications bus. Various other peripheral devices, such as additional data storage devices and printing devices, may also be connected to the computer system 100.

The present technology may be implemented in various forms of hardware, software, firmware, special purpose processors, or a combination thereof, either as part of the microinstruction code or as part of an application program or software product, or a combination thereof, which is executed via the operating system. In one implementation, the techniques described herein are implemented as computer-readable program code tangibly embodied in non-transitory computer-readable media 104. In particular, the present techniques may be implemented by visualization unit 107. Non-transitory computer-readable media 104 may include random access memory (RAM), read only memory (ROM), magnetic floppy disk, flash memory, and other types of memories, or a combination thereof. The computer-readable program code is executed by CPU 101 to process and display images (e.g., MR or CT images) acquired by an imaging device (e.g., MR or CT scanner). As such, the computer system 100 is a general-purpose computer system that becomes a specific purpose computer system when executing the computer-readable program code. The computer-readable program code is not intended to be limited to any particular programming language and implementation thereof. It will be appreciated that a variety of programming languages and coding thereof may be used to implement the teachings of the disclosure contained herein.

The same or different computer-readable media 104 may be used for storing a knowledge base, individual patient data, database of previously treated patients (e.g., training data), and so forth. The patient records, including associated image data, may be stored in external storage or other memories. The external storage may be implemented using a database management system (DBMS) managed by the CPU 101 and residing on a memory, such as a hard disk, RAM, or removable media. The external storage may be implemented on one or more additional computer systems. For example, the external storage may include a data warehouse system residing on a separate computer system, a picture archiving and communication system (PACS), or any other now known or later developed hospital, medical institution, medical office, testing facility, pharmacy or other medical patient record storage system.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

Figure 2:
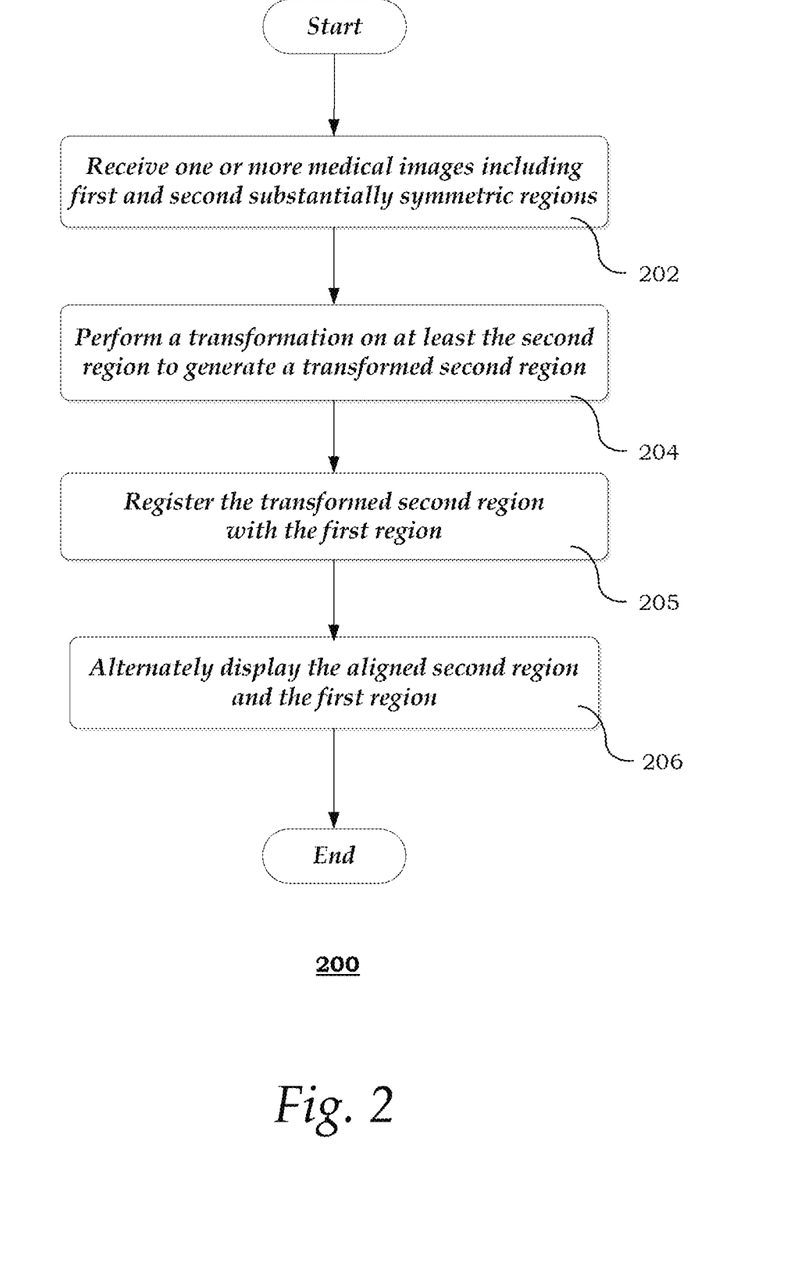
FIG. 2 shows an exemplary method of symmetry-based visualization.

FIG. 2 shows an exemplary method 200 of symmetry-based visualization. The steps of the method 200 may be performed in the order shown or a different order. Additional, different, or fewer steps may be provided. Further, the method 200 may be implemented with the system 100 of FIG. 1, a different system, or a combination thereof.

As shown in FIG. 2, at 202, one or more medical images including first and second substantially symmetric regions are received. The medical images may be extracted from a volumetric image data set. The volumetric image data set may be stored in Digital Imaging and Communications in Medicine (DICOM) format. Any other digital file format may also be used. The medical images may be received from, for example, a storage device, a database system or an archiving system, such as a picture archiving and communication (PACS) system. In addition, the medical images may be acquired by an imaging device using modalities such as magnetic resonance (MR) imaging, computed tomography (CT), helical CT, x-ray, positron emission tomography (PET), PET-CT, fluoroscopic, ultrasound, single-photon emission computed tomography (SPECT), SPECT-CT, MR-PET, etc. Further, the medical images may also be derived from originally acquired image data, such as Maximum Intensity Projection (MaxIP) images, Minimum Intensity Projection (MinIP) images, filtered images, and so forth. Even further, the medical images may be two-dimensional, three-dimensional, or four-dimensional.

Figure 3A:
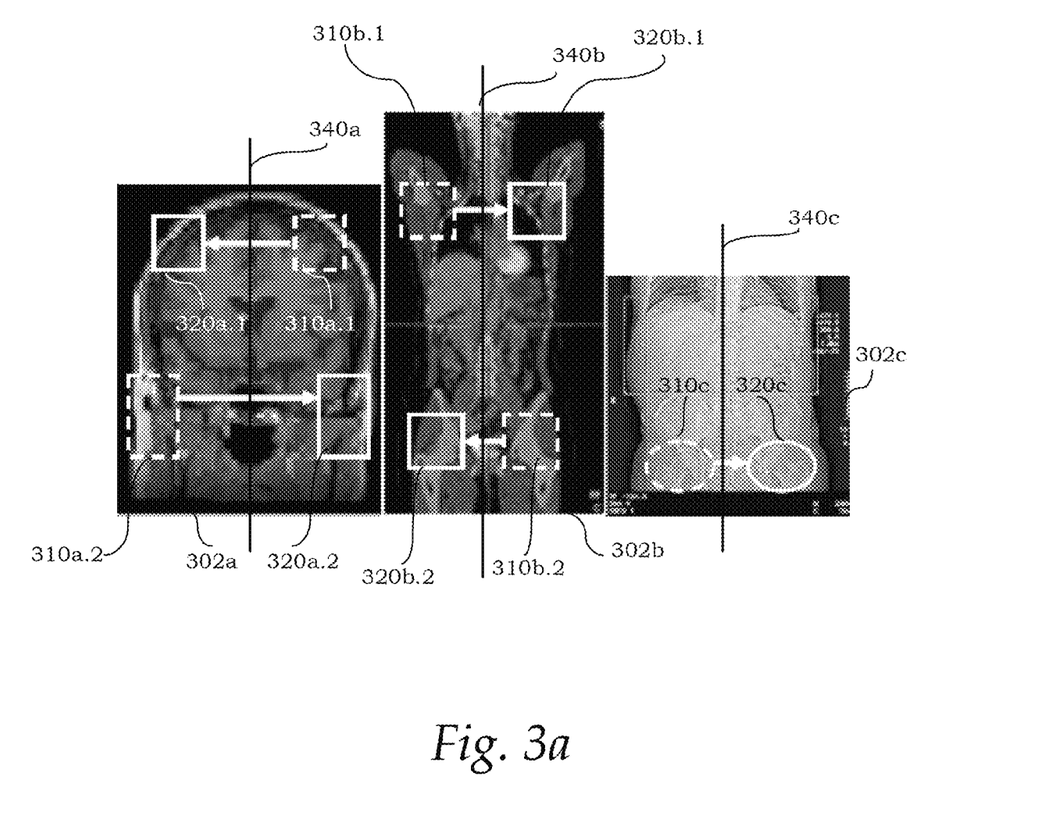
FIG. 3a shows exemplary images of anatomical features that exhibit marked bilateral symmetry.

The one or more medical images may include at least first and second substantially symmetric regions about a point, line or plane of symmetry. FIG. 3a shows exemplary images 302a-c of anatomical structures that exhibit marked bilateral symmetry across the plane of symmetry 340a-c (e.g., mid-sagittal plane). Although the internal structure of the anatomical structure may depart from its normal symmetry, the ideal symmetry plane (e.g., mid-sagittal plane) remains invariant. It should also be noted that although the first and second regions are generally symmetric to each other, there may still be small differences between them caused by the presence of anomalies (e.g., lesions). One of the objects of this framework is to facilitate visual inspection of such differences.

Image 302a shows a coronal view of a human brain. As shown, a first region 310a.1 is located in the left hemisphere and a corresponding second region 320a.1 is located in the right hemisphere of the brain. Another first region 310a.2 is located in the right hemisphere and a corresponding second region 320a.2 is located in the left hemisphere of the brain. Any other locations are also useful. Image 302b shows a coronal view of a human skeletal system. A first region 310b.1 is located at a right pectoral (shoulder) bone and the corresponding second region 320b.1 is located at a left pectoral (shoulder) bone. Another first region 310b.2 is located at a left hip joint and the corresponding second region 320b.2 is located at a right hip joint. Image 302c shows a coronal view of the pelvis and lower back portions. A first region 310c is located at a right pelvic area, while a corresponding second region 320c is located at a left pelvic area.

Figure 3B:
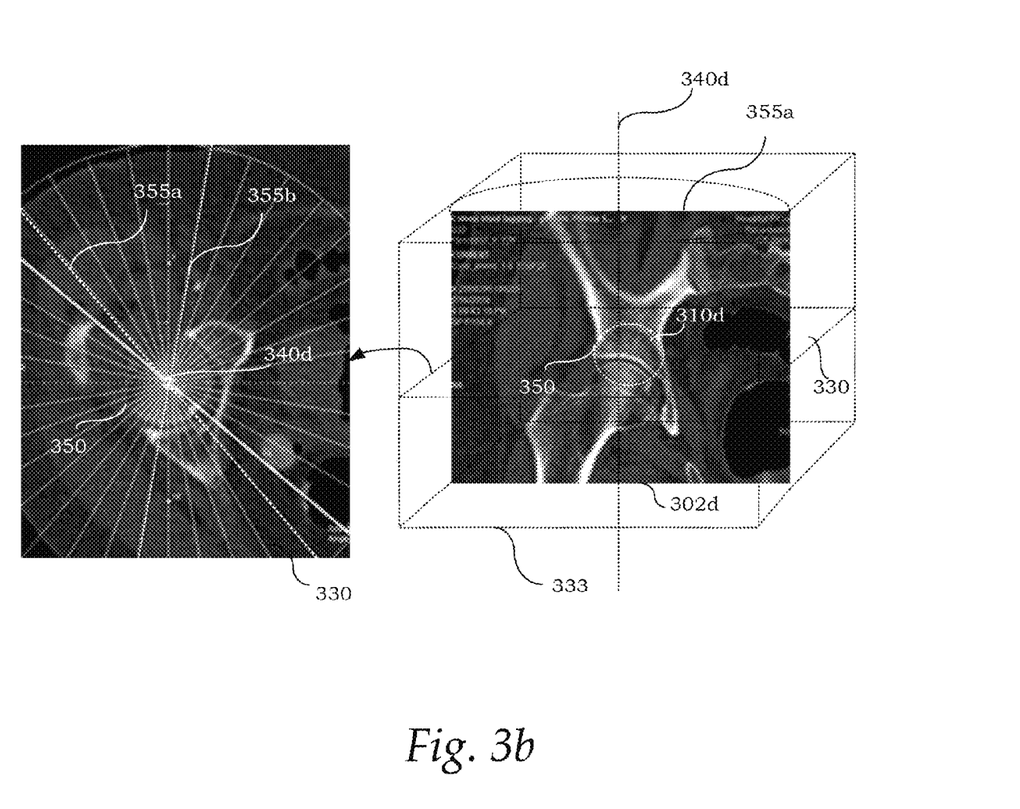
FIG. 3b shows exemplary images of an anatomical feature that exhibits marked rotational symmetry.

As yet another example, FIG. 3b shows exemplary images (330 and 302d) of a femur head 350 that exhibits marked rotational symmetry. More particularly, an axial slice image 330 and a vertical cut plane image 302d of a data volume 333 are shown. The femur head 350 exhibits marked rotational symmetry about the central axis of symmetry 340d that is perpendicular to the slice image 330. Various exemplary cut planes (e.g., 355a-b) pass through the central axis of symmetry 340d. Since the femur head 350 exhibits rotational symmetry, cut plane images reconstructed along the cut planes (e.g., 355a-b) are substantially similar. For purposes of illustration, a cut plane image 302d representing a planar cut through the data volume 333 along one of the cut planes 355a is shown. The first region 310d may be located at a portion of the femur head 350 in the cut plane image 302d. The corresponding second region (not shown) may be located in another cut plane image reconstructed along another cut plane 355b. Since there are multiple cut planes, there may be more than one corresponding second region.

As discussed previously, each image 302a-d may include one or more first regions 310a-d. In one implementation, the one or more first regions 310a-d are localized within (i.e., restricted to a specific portion that is less than the whole of) an image 302a-d. This is useful where the symmetry is localized. For example, while the human skeletal system may exhibit marked symmetry, the neighboring internal organs (e.g., heart) within the image are asymmetrical. Alternatively, the first region 310a-d may include the entire image. This is useful in the case where the whole image exhibits general symmetry.

The one or more first regions 310a-d may be selected by a user via a graphical user interface. The user may select, using an input device (e.g., mouse, touch pad, etc.), the first regions 310a-d for further visual inspection. Alternatively, the first regions 310a-d are automatically selected by the computer system 100. For instance, the computer system 100 or the visualization unit 107 may provide one or more pre-configured views of the pectoral, pelvic or any other region of an anatomical feature. The first regions 310a-d may be delineated by, for example a rectangle, ellipse, polygon, shape that fits the local anatomy or any other regular or irregular shape. Where no selection of any local region within the image 302a-c is made, the first region 310a-c may be the entire image 302a-c.

Each of the first regions may correspond to a second substantially symmetric region. The second substantially symmetric region may be located in the same image as the first region, or in another image. As shown in image 302b, for instance, the first region 310b.1 around the right shoulder bone corresponds to the second region 320b.1 around the left shoulder bone. The first region 310b.2 around the left hip bone corresponds to the second region 320b.2 around the right hip bone. Alternatively, in the case where the left and right shoulder bones appear in first and second separate images, the first region may be located in a first image and the second region may be located in the second image. The first and second images may be acquired at the same or different time points. In addition, the first and second images may be acquired by the same or different modalities.

In one implementation, the second regions are automatically or semi-automatically detected by the computer system 100. For example, the computer system 100 or visualization unit 107 may apply machine-learning algorithm (e.g., AdaBoost) to train a landmark detector for automatically detecting the second regions. Other methods of identifying the second regions, including heuristic or other computational techniques, are also useful. In cases where the entire image constitutes the first region, detection of the second region is not necessary.

Figure 4A:
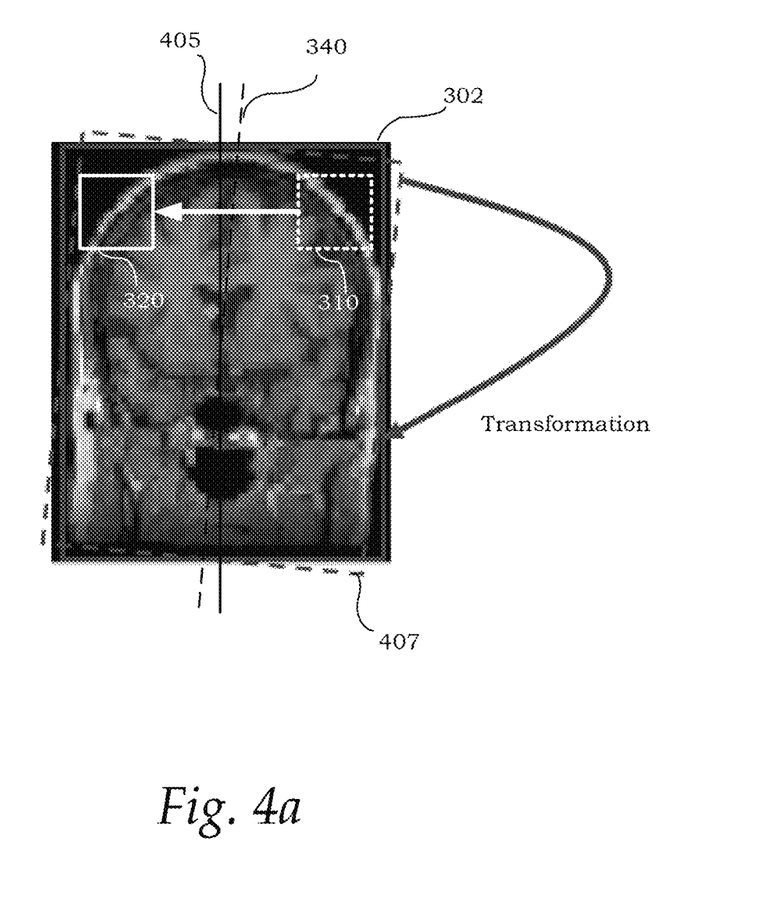
FIG. 4a shows an exemplary image that has been pre-processed.

In one implementation, the image is pre-processed to maximize the symmetry between the first regions and second regions. FIG. 4a shows an exemplary image 302 that has been pre-processed such that the first region 310 and second region 320 are substantially similar about the image plane of symmetry 405. The image plane of symmetry, as used herein, generally refers to the mid-plane or any other convenient plane defined by the coordinate system of the image 302. The ideal plane of symmetry 340 (e.g., mid-sagittal plane) is the plane with respect to which the structure in the image exhibits maximum symmetry. The ideal plane of symmetry 340 is often not aligned with the image plane of symmetry 405 in the original image 407, particularly when the patient's head is tilted or not perfectly positioned during image acquisition.

To account for such positioning error, a transformation may be applied to the original image 407 to generate image 302 in which the ideal plane of symmetry 340 is aligned with the image plane of symmetry 405. The transformation may include, for example, one or more linear transformations, affine transformations, rotations and/or translations non-rigid transformations. The transformation may also include one or more non-rigid, elastic and/or articulated transformations. Other types of transformations are also useful.

Figure 4B:
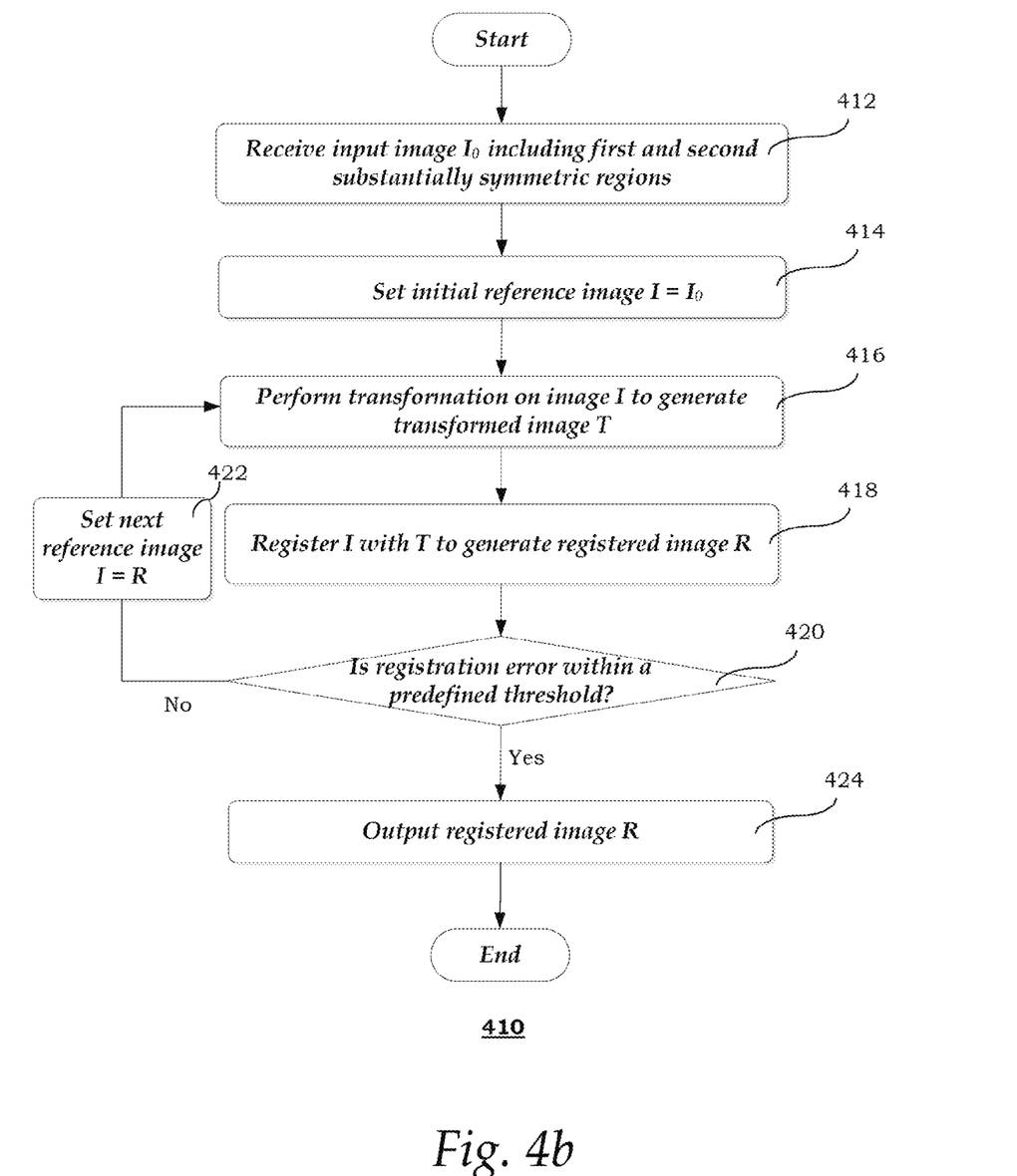
FIGS. 4b and 4c illustrate an exemplary method of preprocessing an image.
Figure 4C:
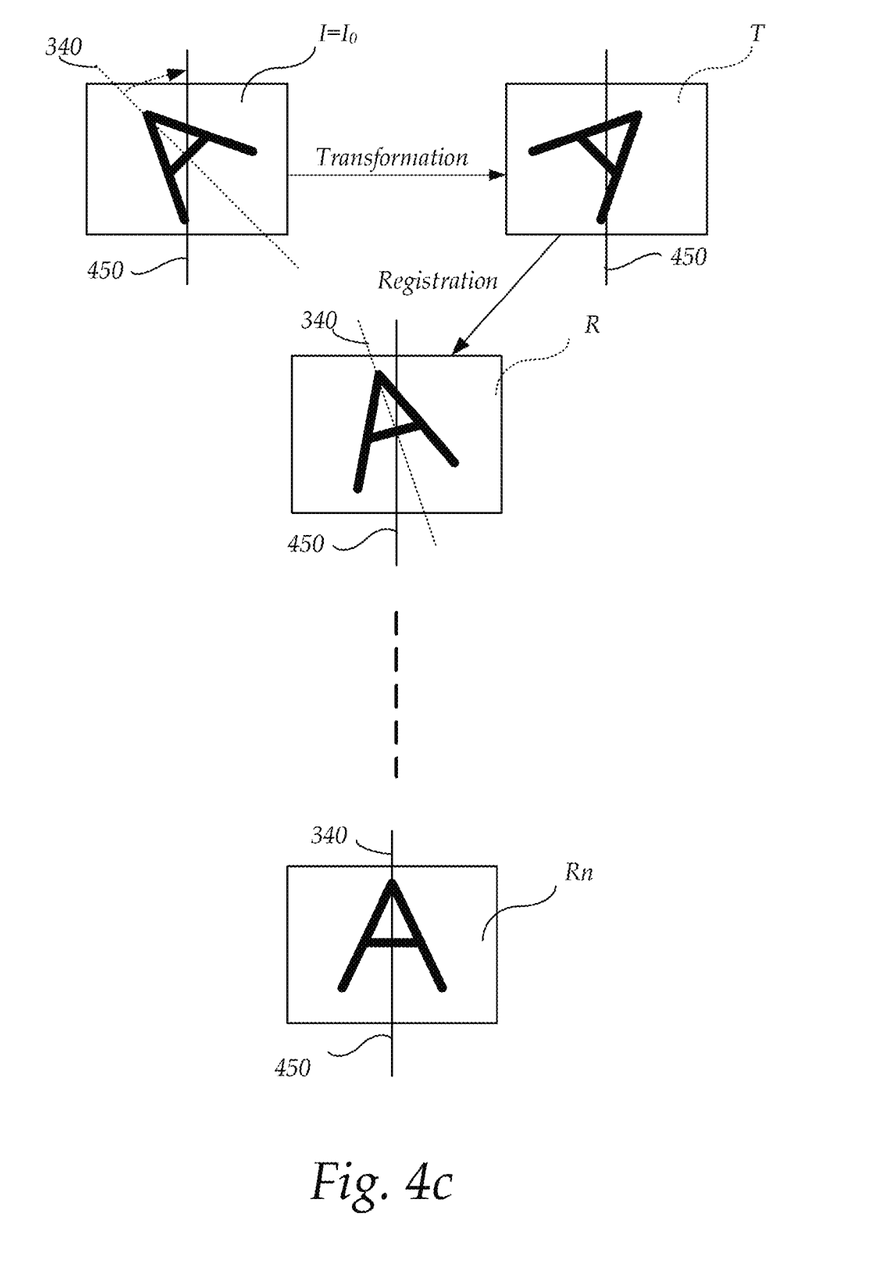

However, there may be some cases when the ideal plane (or line) of symmetry is not readily determined, thereby making it difficult to apply a direct transformation. For example, during image acquisition, the patient's hip may be slightly rotated or distorted due to trauma, thereby resulting in an ideal plane of symmetry that is curved. FIGS. 4b-c illustrate another exemplary method 410 of pre-processing the image to maximize its symmetry. The method 410 automatically searches for an optimally symmetric configuration by iteratively performing a series of transformations and registrations that aligns the ideal plane (or line) of symmetry with the image plane (or line) of symmetry.

At 412, an input image $I_0$ including first and second substantially symmetric regions is received. As previously discussed with reference to FIG. 4a, the ideal plane of symmetry in the image $I_0$ may not coincide with the image plane of symmetry (e.g., mid-plane of the image). At 414, the initial reference image I is set to the input image $I_0$. At 416, a transformation is performed on the reference image I to generate a transformed image T. In one implementation, the transformation includes a reflection (or flip) across the image plane of symmetry.

At 418, the original reference image I is registered against the transformed image T to generate a registered image R. Various types of registration, such as rigid, non-rigid (or deformable), or articulated rigid registration techniques, may be applied. The effect of registering the transformed image T with the reference image I aligns the ideal plane of symmetry closer to the image plane of symmetry.

FIG. 4c illustrates the effect of the transformation and registration steps. As shown, the initial reference image I includes a structure with an ideal plane of symmetry 340 that is misaligned with the image plane of symmetry 450. A reflection across the image plane of symmetry 450 is performed to generate the transformed image T. By registering the original reference image I against the transformed image T, the ideal plane of symmetry 340 is rotated closer to the image plane of symmetry 450.

Turning back to FIG. 4b, at 420, the registration error is determined. The registration error indicates the amount of change introduced by the registration. Such registration error may be measured by, for example, the mean or maximum difference between the original reference image I and the registered image R. If the registration error is not within a predefined threshold (e.g., substantially zero), at 422, the next reference image I is set to the registered image R. Steps 416-420 are repeated until the registration error is within the predefined threshold. If the registration error is within the predefined threshold, the registered image R with the optimally symmetric configuration is output at 424. FIG. 4c shows an exemplary registered image Rn after convergence is achieved. As shown, the ideal plane of symmetry 340 is substantially aligned with the image plane of symmetry 450.

Figure 5:
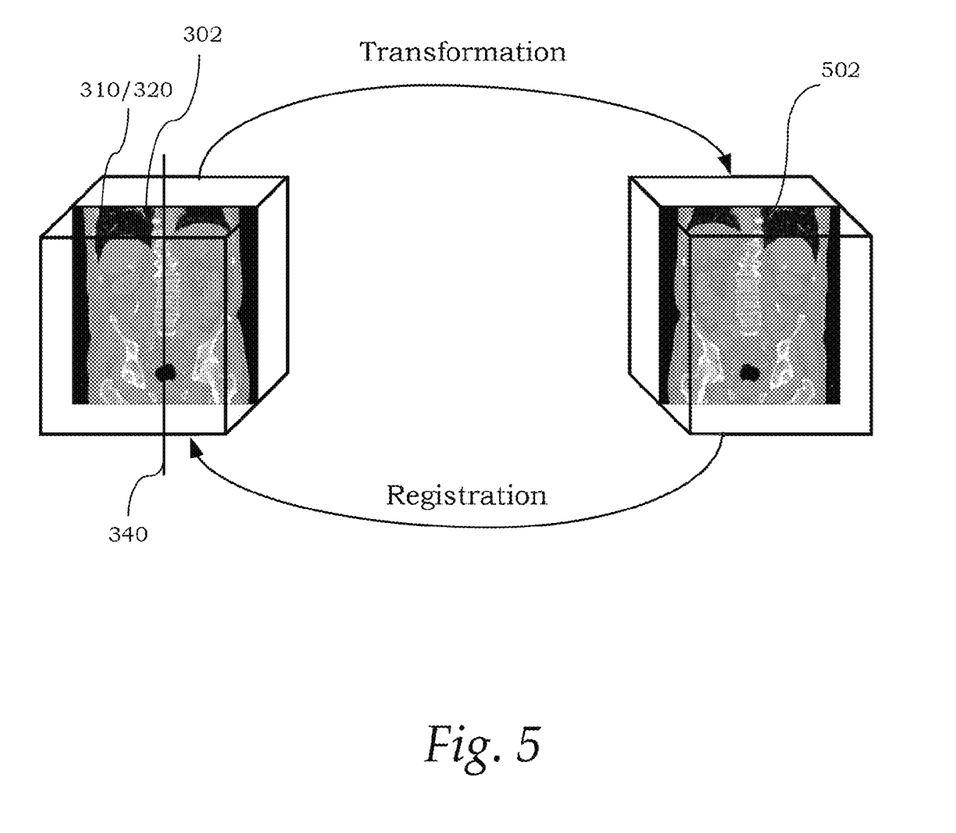
FIG. 5 illustrates an exemplary transformation and registration of a medical image.

Referring back to FIG. 2, at 204, a transformation is performed on at least the second region. The transformation may include a similarity transformation, which produces a transformed second region that is substantially similar to the first region. FIG. 5 illustrates an exemplary transformation and registration of a medical image 302. In this example, the entire image 302 is designated as the first and second regions (310 and 320). As shown, the transformation is performed on the entire image 302 to obtain the bilaterally symmetrical image 502. The transformation includes a reflection (or flip) operation over the plane of symmetry 340. Other types of geometric transformations (e.g., scaling, translation, rotation, etc.) may also be applied. For example, in the case of rotational symmetry, the transformation includes a rotation about a point or axis of symmetry.

At 205, the transformed image (or transformed second region) 502 is registered with the original image (or first region) 302 to align the images (or regions). An aligned image (or aligned second region) is generated as a result of the registration. The image registration process integrates the transformed and original images (502 and 302) into a common coordinate system. It may include a rigid transformation, such as rotation, scaling and/or other affine transformations. Alternatively, or in combination thereof, a deformable (or non-rigid) image registration technique may be applied. Deformable image registration techniques include radial basis functions (e.g., splines), physical continuum models and large deformation models. Other types of image registration techniques, such as articulated rigid registration methods that include piecewise transformations, are also useful. It should be noted that such image registration may also be performed off-line during the pre-processing of the original image and/or prior to any user selection of the first region.

Referring back to FIG. 2, at 206, the aligned second region is alternately displayed with the first region 310 within the display area covered by the first region 310 (hereinafter "alternate display area"). Such alternate display may result in a flickering or flashing pattern of any differences between the first region 310 and aligned second region. The differences may arise due to the presence of one or more anomalies within either the first region 310 or the aligned second region. The aligned second region may be overlaid on the original first region 310 when displayed. In addition, the edge of the aligned second region may either be crisp or fuzzy (i.e. blended with the first region 310).

In cases where the medical image 302 is extracted from a three-dimensional image data volume, the medical image 302 and the alternate display area may be interactively or automatically scrolled to display first regions 310 along different cut planes of the data volume. The alternate display area may be updated with the respective first region 310 and aligned second region computed using method 200. In addition, the alternate display area (or first region 310) may toggle between first regions 310 located at repetitive or similar anatomical structures sampled at different locations. For example, the next first region may be automatically located at a similar anatomical structure, and the alternate display area updated with the first region and corresponding aligned second region.

Figure 6:
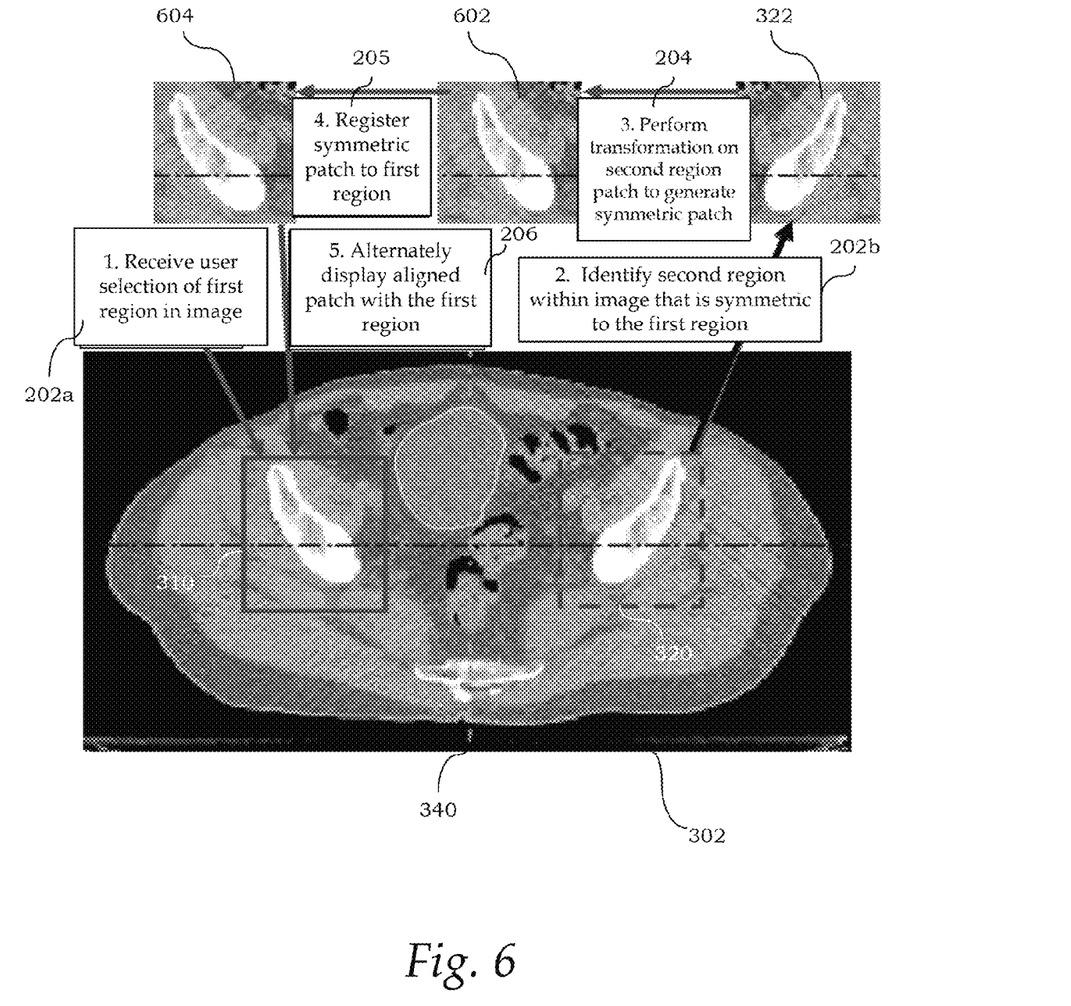
FIG. 6 shows another implementation of the method of symmetry-based visualization.

FIG. 6 shows another implementation of the method 200 of symmetry-based visualization. The steps of the method 200 may be performed in the order shown or a different order. Additional, different, or fewer steps may be provided. Further, the method 200 may be implemented with the system 100 of FIG. 1, a different system, or a combination thereof.

At 202a, user selection of a first region 310 in a medical image is received. As discussed previously, the selection may be performed via a graphical user interface. At 202b, a second region 320 that is substantially symmetric (e.g., bilaterally symmetric), about the plane of symmetry 340, to the first region 310 is identified. As discussed previously, this may be performed automatically using a machine-learning algorithm, a heuristic algorithm, or any other computational method. The second region 320 may be extracted as a local patch 322 for processing.

At 204, a symmetric transformation is performed on the second region patch 322 to generate a symmetric patch 602. As discussed previously, the symmetric transformation may include a reflection (or flip) operation in the case of bilateral symmetry. At 205, the symmetric patch 602 is registered with the first region for alignment, thereby generating the aligned patch 604. The registration operation may include a rigid, non-rigid (deformation) or articulated transformation, as discussed previously.

At 206, the aligned patch is then alternately displayed with the original first region within the image 302. Such alternate display may result in a flickering or flashing pattern in the display area covered by the first region 310. Any differences between the aligned patch and original first region may be "flashing", making them easier to detect. This facilitates visual inspection of the image 302 and allows easy detection of differences (or anomalies) between the first region and the aligned patch 604.

While the present invention has been described in detail with reference to exemplary embodiments, those skilled in the art will appreciate that various modifications and substitutions can be made thereto without departing from the spirit and scope of the invention as set forth in the appended claims. For example, elements and/or features of different exemplary embodiments may be combined with each other and/or substituted for each other within the scope of this disclosure and appended claims.

The invention claimed is:

1. A computer-implemented method of visualization, comprising:
   (i) receiving a medical image including first and second regions, wherein the first region is substantially symmetric to the second region and the first and second regions are localized within the same medical image;
   (ii) performing a transformation on the localized second region to generate a transformed second region;
   (iii) registering the transformed second region with the first region to generate an aligned second region; and
   (iv) alternately displaying the aligned second region and the first region within a localized display area covered by the first region in the medical image.

2. The method of claim 1 wherein the first region is substantially bilaterally symmetric to the second region.

3. The method of claim 1 wherein the first region is substantially rotationally symmetric to the second region.

4. The method of claim 1 further comprising receiving, via a user interface, a user selection of the first region.

5. The method of claim 1 further comprising automatically selecting the first region.

6. The method of claim 1 further comprising automatically detecting the second region.

7. The method of claim 1 further comprising pre-processing the medical image to maximize the symmetry between the first and second regions.

8. The method of claim 7 wherein pre-processing the medical image comprises:
   (v) setting a reference image to the medical image;
   (vi) performing a transformation on the reference image to generate a transformed image; and
   (vii) performing a registration of the reference image with the transformed image to generate a registered image.

9. The method of claim 8 further comprising:
   if an error of the registration is not within a predefined threshold, setting the reference image to the registered image and repeating steps (vi) and (vii).

10. The method of claim 1 wherein performing the transformation on the localized second region comprises performing a reflection operation on the localized second region.

11. The method of claim 1 wherein performing the transformation on the localized second region comprises performing a rotation on the localized second region.

12. The method of claim 1 wherein alternately displaying the aligned second region and the first region comprises overlaying the aligned second region on the first region.

13. A non-transitory computer readable medium embodying a program of instructions executable by machine to perform steps for visualization, the steps comprising:
(i) receiving first and second medical images including first and second regions, wherein the first region is substantially symmetric to the second region, the first region is localized within the first medical image and the second region is localized within the second medical image;
(ii) performing a transformation on the localized second region to generate a transformed second region;
(iii) registering the transformed second region with the first region to generate an aligned second region; and
(iv) alternately displaying the aligned second region and the first region within a localized display area covered by the first region in the first medical image.

14. A symmetry-based visualization system, comprising:
a non-transitory memory device for storing computer readable program code; and
a processor in communication with the memory device, the processor being operative with the computer readable program code to:
(i) receive one or more medical images including first and second regions, wherein the first region is substantially symmetric to the second region and the first and second regions are localized within the one or more medical images;
(ii) perform a transformation on the localized second region to generate a transformed second region;
(iii) register the transformed second region with the first region to generate an aligned second region; and
(iv) alternately display the aligned second region and the first region within a localized display area covered by the first region.

15. A method of processing images, comprising:
(i) receiving, by a processor, an input image including first and second substantially symmetric regions;
(ii) setting, by the processor, a reference image to the input image;
(iii) performing, by the processor, a reflection across a plane of symmetry of the reference image to generate a transformed image;
(iv) performing, by the processor, a registration of the reference image with the transformed image to generate a registered image; and
(v) if an error of the registration is not within a predefined threshold, setting, by the processor, the reference image to the registered image and repeating steps (iii) and (iv) to search for an optimally symmetric configuration.

* * * * *